United States Patent
Horner et al.

(10) Patent No.: US 6,737,988 B2
(45) Date of Patent: May 18, 2004

(54) INSTRUMENTATION AND CONTROL CIRCUIT HAVING MULTIPLE, DISSIMILAR SOURCES FOR SUPPLYING WARNINGS, INDICATIONS, AND CONTROLS AND AN INTEGRATED CABIN PRESSURE CONTROL SYSTEM VALVE INCORPORATING THE SAME

(75) Inventors: Darrell W. Horner, Oro Valley, AZ (US); Joaquin P. Rabon, Tucson, AZ (US); Andrew D. Bunn, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 71 days.

(21) Appl. No.: 10/080,107

(22) Filed: Feb. 21, 2002

(65) Prior Publication Data

US 2003/0157875 A1 Aug. 21, 2003

(51) Int. Cl.[7] ............................................. G08B 21/00
(52) U.S. Cl. ..................... 340/970; 340/977; 454/72
(58) Field of Search ................ 340/963, 967, 340/970, 974, 977; 454/72, 74, 71

(56) References Cited

U.S. PATENT DOCUMENTS

| 3,375,771 | A |   | 4/1968  | Balcom |
| 4,164,894 | A |   | 8/1979  | Yamanaka |
| 4,164,897 | A | * | 8/1979  | Aldrich et al. ............... 454/72 |
| 4,164,898 | A | * | 8/1979  | Burgess et al. ............... 454/72 |
| 4,164,899 | A |   | 8/1979  | Burgess |
| 4,164,900 | A | * | 8/1979  | Aldrich ........................ 454/72 |
| 4,553,474 | A | * | 11/1985 | Wong et al. .................. 454/74 |
| 4,864,463 | A |   | 9/1989  | Shkedi et al. |
| 4,876,892 | A |   | 10/1989 | Arabia et al. |
| 4,887,214 | A |   | 12/1989 | Takats et al. |
| 5,046,686 | A |   | 9/1991  | Carla et al. |
| 5,273,486 | A |   | 12/1993 | Emmons et al. |
| 5,274,554 | A |   | 12/1993 | Takats et al. |
| 5,297,987 | A |   | 3/1994  | Emmons et al. |
| 5,334,090 | A |   | 8/1994  | Rix |
| 5,520,578 | A |   | 5/1996  | Bloch et al. |
| 5,590,852 | A |   | 1/1997  | Olson |
| 5,631,656 | A |   | 5/1997  | Hartman et al. |
| 5,934,614 | A |   | 8/1999  | Mueller et al. |

FOREIGN PATENT DOCUMENTS

| GB | 1 604 286 A | 12/1981 |
| WO | WO 02/08056 A1 | 1/2002 |

* cited by examiner

Primary Examiner—Van Trieu
(74) Attorney, Agent, or Firm—Robert Desmond, Esq.

(57) ABSTRACT

An integrated cabin pressure control system valve that uses a dual, redundant channel electronic control unit for both control of the valve and to supply alarm, indication, and control signals to the aircraft's avionics system. Each channel in the electronic control unit includes an instrumentation and control circuit that uses multiple, dissimilar sensors and signals for warnings, indications, and controls. This configuration reduces the likelihood for a common mode failure that could result in a postulated gradual decompression without indication event.

54 Claims, 3 Drawing Sheets

INSTRUMENTATION AND CONTROL CIRCUIT HAVING MULTIPLE, DISSIMILAR SOURCES FOR SUPPLYING WARNINGS, INDICATIONS, AND CONTROLS AND AN INTEGRATED CABIN PRESSURE CONTROL SYSTEM VALVE INCORPORATING THE SAME

BACKGROUND OF THE INVENTION

The present invention relates to aircraft valves and instrumentation and control equipment and, more particularly, to an improved integrated cabin pressure control system valve that includes an improved instrumentation and control circuit.

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, the ambient pressure outside of the aircraft decreases and, unless otherwise controlled, excessive amounts of air could leak out of the aircraft cabin causing it to decompress to an undesirably low pressure. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Studies have shown that the symptoms of hypoxia may become noticeable when cabin pressure altitude is above the equivalent of 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin pressure altitude to minimize passenger discomfort.

In addition to a control system for maintaining cabin pressure altitude, regulations promulgated by various governmental certification authorities require that aircraft be equipped with specified indications and/or warnings to alert pilots to a decompression event. In particular, these regulations require that pilots be provided with an indication of actual cabin pressure altitude, and the differential pressure between cabin pressure altitude and actual pressure altitude outside of the aircraft. These regulations also require that the pilots be provided with a visual or audible warning, in addition to the indications, of when the differential pressure and cabin pressure altitude reach predetermined limits. Moreover, in order for an aircraft to be certified for flights above 30,000 feet, it must include oxygen dispensing units that automatically deploy before the cabin pressure altitude 15,000 feet.

In order to meet the above-noted requirements for alarm, indication, and oxygen deployment, various types of systems and equipment have been developed. For example, some systems have included analog-pneumatic gages and aneroid switches, audible alarms, warning lights, and/or color coded messages. One particular system, known as a cabin pressure acquisition module (CPAM), is a stand-alone component that uses a single pressure sensor to provide the alarm, indication, and oxygen deployment capabilities. In addition, some cabin pressure control systems are designed to not only perform cabin pressure control operations, but to use the pressure sensor within the cabin pressure control system to provide the same alarms, indications, and oxygen deployment functions as the CPAM.

Aircraft and the cabin pressure control systems installed on aircraft are robustly designed and manufactured, and are operationally safe. Nonetheless, in addition to providing the alarm, indication, and oxygen deployment functions noted above, certification authorities also require that aircraft be analyzed for certain events that may occur under certain, highly unlikely conditions. For example, one particular type of hypothetical event that aircraft may be analyzed for is known as a "gradual decompression without indication." In analyzing such an event, a component failure is postulated that causes the cabin of the aircraft to gradually decompress. In addition, the system that provides the alarm, indication, and oxygen deployment functions is also postulated to fail, resulting in a hypothetical loss of indication and/or warning of the decompression, and no oxygen deployment.

Previously, the gradual decompression without indication event was classified by certification authorities as a "major" event. This meant that the probability of the event was less than one occurrence per 1,000,000 flight hours (e.g., $10^{-6}$ event/flight-hour). Certification authorities have recently changed the classification of this event to a "catastrophic" event. A catastrophic event is one in which the probability less than one occurrence per billion flight-hours (e.g., $10^{-9}$ event/flight-hour).

One particular design option that may be implemented to meet the above regulations is to use a CPAM in combination with a cabin pressure control system. To reduce the likelihood of common mode failure, the two systems may use different transmission methods to output the information for alarm, indication, and oxygen deployment (e.g., one system may use ARINC 429 protocol, the other may use RS422 protocol). This implementation, while it may reduce the likelihood for the gradual decompression without indication event to less than $10^{-9}$ event/flight-hour, also presents certain drawbacks. In particular, this implementation may result in substantially increased costs and aircraft down time associated with installation, integration, and maintenance. It may also result in increased aircraft weight and reduced space.

Hence, there is a need for an aircraft pressure control system that provides the necessary alarm, indication, and oxygen deployment functions, that is designed in a manner to meet stringent safety guidelines for a gradual decompression without indication event, and that does not substantially increase installation, integration, and maintenance costs, and/or does not significantly increase aircraft weight, and/or does not take up additional space within the aircraft. The present invention addresses one or more of these needs.

SUMMARY OF THE INVENTION

The present invention provides an instrumentation and control circuit that uses multiple, dissimilar sensors and signals for warnings, indications, and controls, and that may be used with an integrated cabin pressure control system valve. The circuit is designed to reduce the likelihood of a gradual decompression without indication event, and does not result in substantially increased installation, integration, and maintenance costs, and/or does not significantly increase aircraft weight, and/or does not take up additional space within the aircraft.

In one embodiment of the present invention, and by way of example only, an aircraft cabin pressure control valve includes a valve body, a valve, at least two controller circuits, and a valve actuator. The valve is mounted in the valve body and is moveable between a closed and open position. The controller circuits are mounted on the valve body, and are operable to sense the cabin pressure and supply a valve actuation signal. The valve actuator is mounted on the valve body and is operable, in response to one or more of the valve actuation signals, to position the outflow valve to any one of the plurality of positions. Each of the controller circuits includes a first pressure sensor, a second pressure sensor, a digital signal conditioning circuit, an analog signal conditioning circuit, and a processor. The first pressure sensor is operable to sense aircraft cabin pressure and supply a first pressure signal representative thereof. The second pressure sensor is dissimilar from the first pressure sensor and is operable to sense aircraft cabin pressure and supply a second pressure signal representative thereof. The digital signal conditioning circuit is coupled to receive the first pressure signal and is operable, in response thereto, to supply a digital pressure signal. The analog signal conditioning circuit is coupled to receive the second pressure signal and is operable, in response thereto, to supply an analog pressure signal. The processor is coupled to receive the analog pressure signal and the digital pressure signal and is operable, in response thereto, to supply at least (i) a signal representative of cabin pressure altitude and (ii) the valve actuation signal.

In another embodiment, a circuit for supplying one or more signals representative of an aircraft cabin environment includes a first pressure sensor, a second pressure sensor, a digital signal conditioning circuit, an analog signal conditioning circuit, and a processor. The first pressure sensor is operable to sense aircraft cabin pressure and supply a first pressure signal representative thereof. The second pressure sensor is dissimilar from the first pressure sensor and is operable to sense aircraft cabin pressure and supply a second pressure signal representative thereof. The digital signal conditioning circuit is coupled to receive the first pressure signal and is operable, in response thereto, to supply a digital pressure signal. The analog signal conditioning circuit is coupled to receive the second pressure signal and is operable, in response thereto, to supply an analog pressure signal. The processor is coupled to receive the analog pressure signal and the digital pressure signal and is operable, in response thereto, to supply at least a signal representative of cabin pressure altitude.

In still another embodiment, a controller circuit for controlling the position of a cabin pressure control system outflow valve includes a first pressure sensor, a second pressure sensor, a digital signal conditioning circuit, an analog signal conditioning circuit, and a processor. The first pressure sensor is operable to sense aircraft cabin pressure and supply a first pressure signal representative thereof. The second pressure sensor is dissimilar from the first pressure sensor and is operable to sense aircraft cabin pressure and supply a second pressure signal representative thereof. The digital signal conditioning circuit is coupled to receive the first pressure signal and is operable, in response thereto, to supply a digital pressure signal. The analog signal conditioning circuit is coupled to receive the second pressure signal and is operable, in response thereto, to supply an analog pressure signal. The processor is coupled to receive the analog pressure signal and the digital pressure signal and is operable, in response thereto, to supply at least (i) a signal representative of cabin pressure altitude and (ii) the valve actuation signal.

In yet another embodiment of the present invention, a method of determining cabin pressure altitude in an aircraft cabin includes the steps of determining cabin pressure using a first pressure determination method, determining cabin pressure using a second pressure determination method that is different from the first pressure determination method, and determining cabin pressure altitude based on the cabin pressure determined using at least one of the first and the second pressure determination methods.

In yet still a further embodiment, in an aircraft cabin pressure control system having an outflow valve that is used to control cabin pressure in an aircraft, a method of controlling outflow valve position includes the steps of determining the cabin pressure using a first pressure determination method, determining the cabin pressure using a second pressure determination method that is different from the first pressure determination method, determining cabin pressure altitude based on the cabin pressure determined using at least one of the first and the second pressure determination methods, and controlling the position of the outflow valve based on the determined cabin pressure altitude.

Other independent features and advantages of the preferred circuit and valve will become apparent from the following detailed description, taken in conjunction with the accompanying drawings which illustrate, by way of example, the principles of the invention.

DETAILED DESCRIPTION OF VARIOUS EMBODIMENTS

Figure 1:
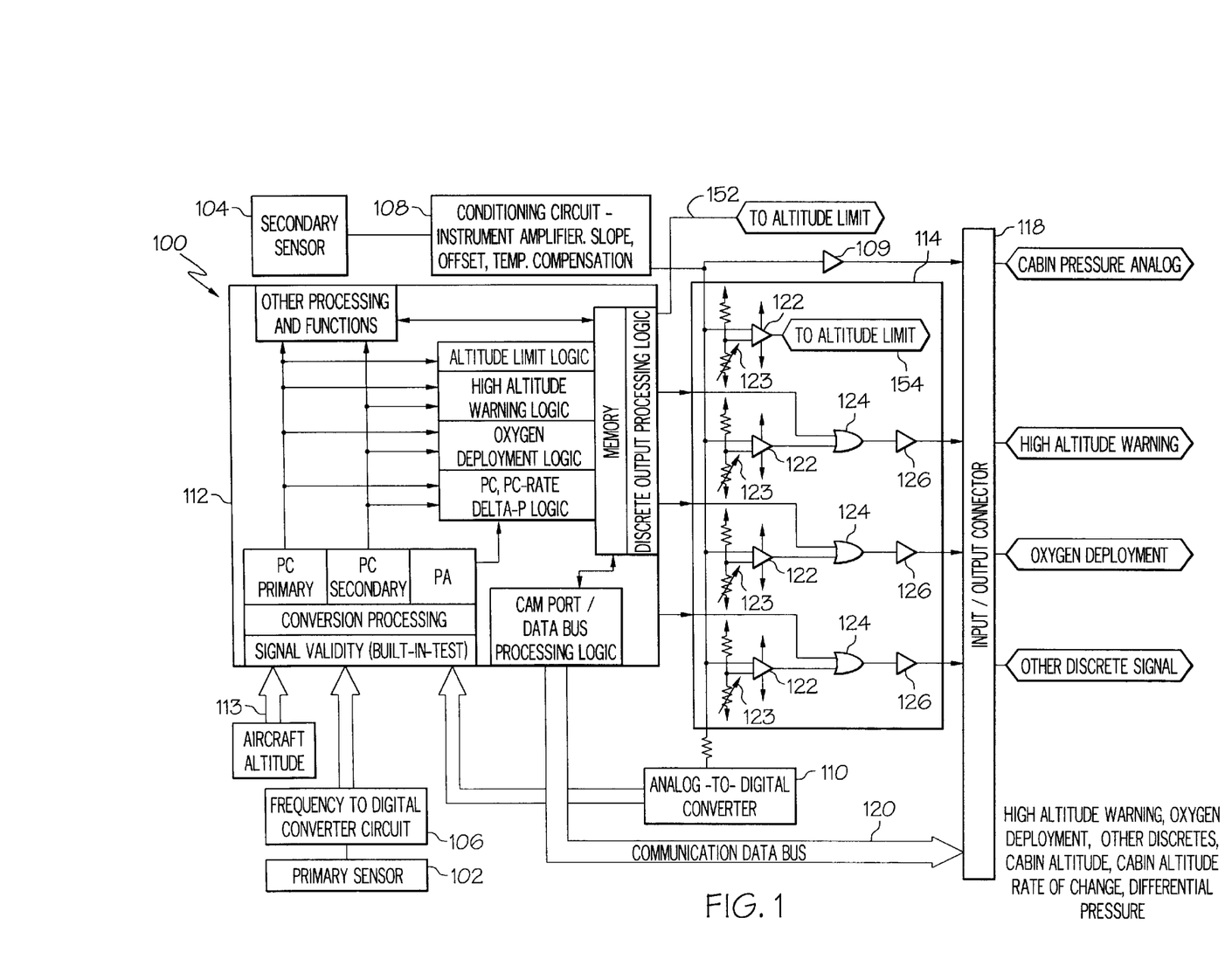
FIG. 1 is a functional schematic block diagram of an instrumentation and control circuit according to an embodiment of the present invention.

A functional schematic block diagram of an instrumentation and control circuit according to a particular preferred embodiment of the present invention is depicted in FIG. 1. As depicted therein, the instrumentation and control circuit 100 includes two pressure sensors, a first (or primary) pressure sensor 102 and a second (or secondary) pressure sensor 104. The circuit 100 also includes two signal conditioning circuits, a first signal conditioning circuit 106 and a second signal conditioning circuit 108, and further includes an analog-to-digital converter (A/D) circuit 110, a processor 112, and a discrete signal processing circuit 114. The primary pressure sensor 102 and the second pressure sensor 104 both serve the same purpose, sensing cabin pressure and supplying a signal representative of cabin pressure. However, in the preferred embodiment, the primary 102 and secondary 104 pressure sensors are either physically or functionally dissimilar, or both. For example, in a preferred embodiment, the primary pressure sensor 102 is a capacitance type pressure sensor and the secondary pressure sensor 104 is a piezoresistive type sensor. Thus, the sensors 102, 104 are both physically and functionally dissimilar. However, it will be appreciated that the sensors 102, 104 could be physically dissimilar from each other while being functionally similar. For example, both sensors 102, 104 could be capacitance type pressure sensors (or piezoresistive type sensors) that are constructed physically dissimilar. It will additionally be appreciated that these sensor types are only exemplary of a preferred embodiment and that the primary 102 and secondary 104 pressure sensors could be other types of sensors including, but not limited to, strain gage sensors, optical type sensors, and thermal type sensors, so long as the sensors are physically and/or functionally dissimilar.

The cabin pressure signals supplied by the primary 102 and secondary 104 pressure sensors are properly conditioned for further processing and transmission by the first 106 and second 108 signal conditioning circuits, respectively. Similar to the dissimilarity of the primary 102 and secondary 104 pressure sensors, the first 106 and second 108 signal conditioning circuits are also dissimilar. Specifically, the first signal conditioning circuit 106 is a digital signal conditioning circuit that converts the pressure signal from the primary pressure sensor 102 into a digital signal, whereas the second signal conditioning circuit 108 is an analog conditioning circuit. For example, in the depicted embodiment, in which the primary pressure sensor 102 is a capacitance pressure sensor, the first signal conditioning circuit 108 is a frequency-to-digital (F-to-D) converter circuit. A F-to-D converter circuit is used since, as is generally known, in a capacitance pressure sensor the capacitance of its sensing element varies with pressure. Thus, the frequency of an alternating current (AC) signal supplied by a capacitance pressure sensor will vary in proportion to the sensed pressure. The second signal conditioning circuit 108 is, in the depicted embodiment, an analog amplifier circuit with slope, offset, and temperature compensation circuitry, which supplies a direct current (DC) signal that is proportional to the sensed cabin pressure. It will be appreciated that the first 106 and second 108 signal conditioning circuits depicted in FIG. 1 are only exemplary of a preferred embodiment and that other types of digital and analog signal conditioning circuits could also be used to provide appropriate signal conditioning for the primary 102 and secondary 104 pressure sensors. However, no matter what type of signal conditioning circuits are used, it is preferred that the first 106 and second 108 signal conditioning circuits be dissimilar.

Turning now to the remainder of the circuit, it can be seen that the conditioned analog pressure signal supplied by the second signal conditioning circuit 108 is supplied to the A/D circuit 110, and may also be supplied, via a buffer amplifier 109 and an input/output (I/O) connector 118, directly to an external avionics system. It is noted that the conditioned analog pressure signal is also supplied to the discrete signal processing circuit 114, which is discussed further below. The A/D circuit 110 receives the conditioned analog pressure signal from the second signal conditioning circuit 108 and, in a conventional manner, converts the analog pressure signal to an equivalent digital signal. The A/D circuit 110 may be any one of numerous A/D circuits known in the art for providing this functionality. It is additionally noted that the A/D circuit 110 may be a separate circuit element or it may be an integrated part of the processor 112, which will now be described.

The processor 112 receives the digital pressure signals supplied by the first signal conditioning circuit 106 and the A/D circuit 110. The processor 112 also receives a digital signal representative of aircraft altitude 113 from an external source. The processor 112, using software that is stored either externally or in on-board memory, then processes these digital pressure signals to supply the alarm, indication, and control signals necessary to meet aircraft certification requirements, as well as additional indication signals not specifically needed to meet certification requirements. Namely, the processor 112 supplies signals representative of at least cabin pressure altitude, cabin pressure altitude rate of change, cabin-to-ambient differential pressure, and high cabin altitude warning and oxygen deployment control signals. To do so, the processor 112 utilizes appropriate conversion software to determine cabin pressure ($P_c$) based on the primary sensor pressure signal ($P_c$ Primary), cabin pressure based on the secondary pressure signal ($P_c$ Secondary), and atmospheric pressure based on the aircraft altitude signal ($P_a$). The processor 112 uses either the determined primary cabin pressure ($P_c$ Primary) or secondary cabin pressure ($P_c$ Secondary), in combination with the determined atmospheric pressure ($P_a$), to determine cabin pressure altitude, cabin pressure altitude rate of change, and cabin-to-ambient differential pressure, and to generate discrete logic signals such as a high cabin altitude warning signal, an altitude limit signal, and an oxygen deployment logic signal. The processor 112 may also generate other discrete alarm, warning, or logic signals as needed by the particular aircraft. Typically, the processor 112 uses the determined primary pressure ($P_c$ Primary) to determine the alarm, indication and logic signals, with the determined secondary pressure ($P_c$ Secondary) being used as a backup. The processor 112 includes built-in-test (BIT) software that determines the validity of the primary and secondary pressure signals by, among other things, determining if the input signal and power supply voltages are within specified tolerances, that the output signals from the sensors are within predetermined ranges, and comparing the output signals from the pressure sensors with one another. Thus, if the BIT software determines that the primary pressure signal is lost or that the sensor is inoperable, then the processor 112 will use the determined secondary cabin pressure ($P_c$ Secondary) instead.

Once the pressure indications, alarms, and deployment logic signals are determined, the processor 112 then transmits these data signals in at least two different data transmission formats. The first transmission format is a data bus communications format. In a preferred embodiment, this first transmission format is the ARINC 429 protocol, though various other data bus communication protocols may also be used including, but not limited to, RS 422 and ARINC 629. As will be discussed further below, the data signals transmitted using the data bus communication format are supplied, via a communications bus 120 and the I/O connector 118, to the aircraft's display/indication/warning system (e.g., the avionics system) for further processing. It is noted that the first transmission format could be implemented using programmable logic device (PLD) circuitry; however, in the preferred embodiment, software is used to provide cost, weight, and size savings. The second data transmission format is a discrete signal format. The data signals transmitted in the discrete signal format are supplied to the discrete signal processing circuit 114.

The discrete signal processing circuit 114 receives the conditioned analog pressure signal from the second signal conditioning circuit 108 and at least a portion of the discrete logic signals from the processor 112, and supplies appropriate discrete logic signals, via the output connector 118, to the aircraft's avionics system. In the depicted embodiment, the discrete signal processing circuit 114 includes a plurality of comparator circuits 122, a plurality of logic OR circuits 124, and a plurality of inverter buffer amplifier circuits 126. One of each of these circuits is provided for each of the discrete logic signals supplied to the avionics system. As depicted, each comparator circuit 122 has at least two input terminals, one input terminal is coupled to receive the conditioned analog pressure signal and the other input terminal is coupled to a variable voltage divider 123 that is set to a predetermined voltage set point. Each comparator circuit 122 operates identically. That is, when the conditioned analog pressure signal magnitude is less than the particular voltage set point, the comparator circuit 122 will output a logic high signal, otherwise it outputs a logic low signal. The output of each comparator circuit 122 is coupled to one of the logic OR circuits 124.

Similar to the comparator circuits 122, each logic OR circuit 124 includes at least two input terminals. As was noted above, one of the input terminals is coupled to the output of one of the comparator circuits 122. The other input terminal is coupled to receive one of the discrete signals supplied by the processor 112. As is generally known, a logic OR circuit outputs a logic high signal when one or more of its inputs is high, and outputs a logic low signal only when all of its inputs are low. Thus, in the depicted embodiment, each logic OR circuit 124 will output a logic high signal when either its corresponding comparator circuit 122 outputs a high signal or the discrete signal supplied to it by the processor 112 is a high signal. The output of each logic OR circuit 124 is coupled to the input of one of the inverter buffer amplifiers 126, which inverts the logic OR circuit output and supplies this inverted discrete logic signal, via the I/O connector 120, to the avionics system. It is noted that the processor's 112 discrete outputs and the analog discrete outputs (i.e., the comparator circuit 122 outputs) could be supplied to the avionics system separately, rather than logically ORing the signals together. However, by logically ORing the signals, a single output for each discrete signal is used, which saves on the overall wiring in the aircraft. Moreover, it will be appreciated that the buffer amplifiers 126 could be either high-side drivers or low-side drivers, depending on the logic being implemented.

As FIG. 1 further depicts, the circuit 100 may also be used to provide two separate altitude limit discrete signals, a first altitude limit discrete signal 152 that is based on the pressure sensed by the primary pressure sensor 102 and a second altitude limit discrete signal 154 that is based on the pressure sensed by the secondary pressure sensor 104. These discrete signals are not logically OR'd, but are provided as separate discrete signal outputs. As is generally known, the altitude limit discrete signals 152, 154 may be supplied to a cabin pressure control system and, if so, may override both automatic and manual control of the cabin pressure control valve. Thus, this function is implemented in a two-out-of-four coincidence logic scheme, so that if one fails it will neither cause nor prevent the override function. As will be described further below, if these signals 152, 154 are indeed supplied to a cabin pressure control system, when one or more of the conditioned pressure signals indicate that the cabin pressure is at or above the altitude limit set point, the cabin pressure control system closes the aircraft's outflow valves.

The instrumentation and control circuit 100 uses two dissimilar pressure sensors to sense cabin pressure and two dissimilar signal conditioning circuits. The circuit 100 also formats and transmits data using a plurality of different data transmission formats. As a result, the likelihood of a common mode failure rendering the circuit 100 inoperative, or preventing transmission of data, is extremely small. The circuit 100 may be implemented as a stand-alone instrumentation and control circuit, or in a redundant, dual channel system, which would further reduce the likelihood of failure or loss of signal due to a common mode failure. The circuit 100 may also be implemented as part of the aircraft's cabin pressure control system. Indeed, in a particular preferred embodiment, the circuit 100 is implemented in an integrated cabin pressure control system having dual, redundant electronic controllers. When the circuit 100 is implemented in this configuration, the processor 112 not only supplies indication, alarm, and oxygen deployment logic signals, but it also supplies actuation control signals that are used to control the position of one or more cabin pressure control system valves. A description of this implementation will now be provided. In doing so, reference should now be made to FIG. 2.

Figure 2:
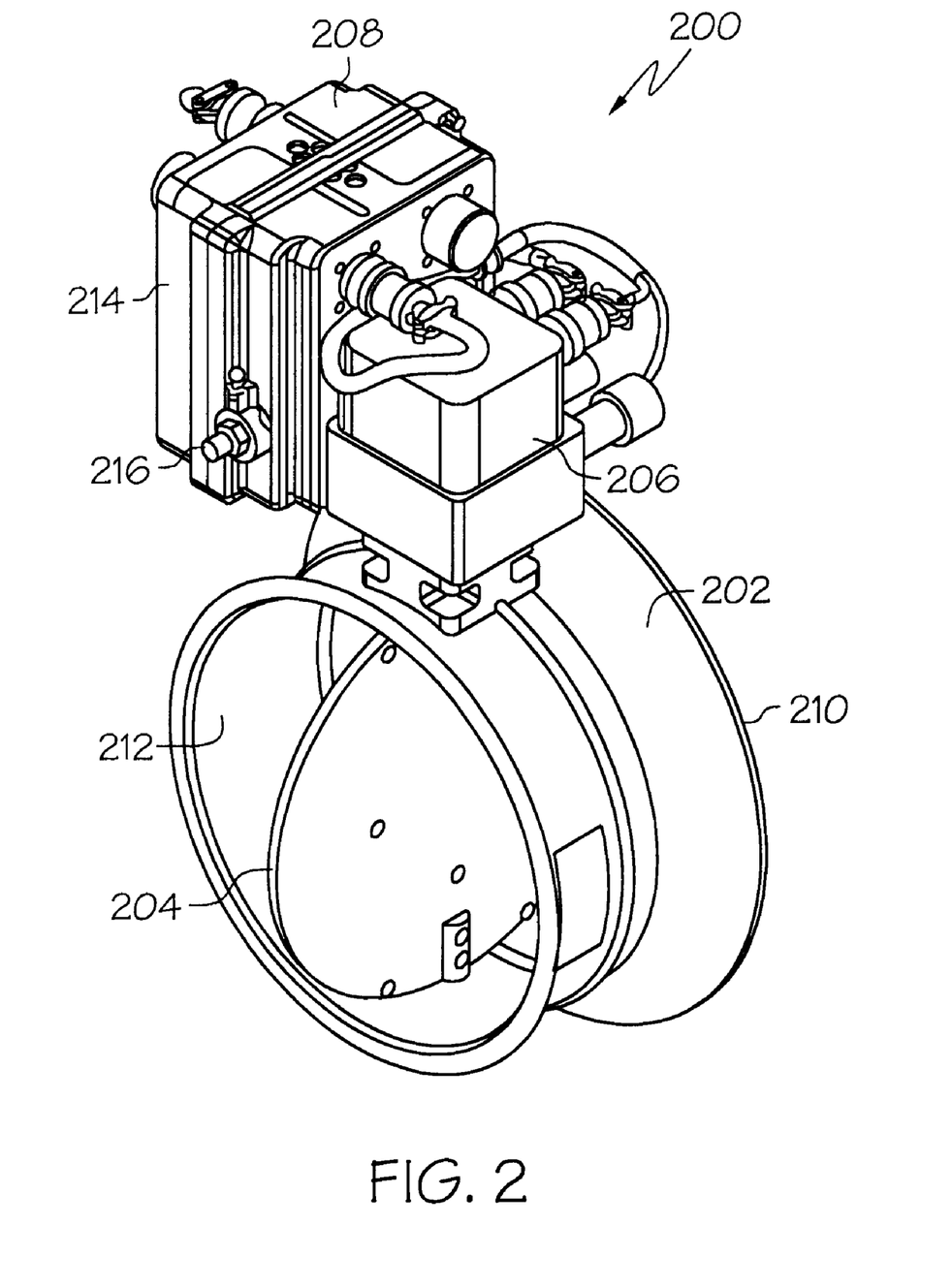
FIG. 2 is a perspective view of an integrated cabin pressure control system valve that uses one or more of the circuits depicted in FIG. 1.

The general structure of an integrated cabin pressure control system valve 200, according to one embodiment of the present invention, includes a valve body 202, a valve disk 204, an actuator assembly 206, and an electronic control unit 208. The valve body 202 is preferably configured as a generally tubular duct, having an inlet flow port 210 and an outlet flow port 212. The valve disk 204 is rotationally mounted within the valve body 202 between the inlet 210 and outlet 212 flow ports and is preferably a butterfly plate, though it will be appreciated that other types of valve disks may be used. The valve disk 204 is coupled to the actuator assembly 206, which is used to position the valve disk 204 between its opened and closed positions. The electronic control unit 208 is contained within a housing 214 and includes at least two redundant channels. Each of these redundant channels includes the above-described instrumentation and control circuit 100, and a motor control circuit, which will be described further below. The electronic control unit housing 214 includes a plurality of openings 216, preferably one for each of the redundant channels in the electronic control unit 208. These openings 216 allow the primary 102 and secondary 104 pressure sensors in each circuit 100 to sense aircraft cabin pressure.

Having described the structural configuration of a preferred embodiment of the integrated cabin pressure control system valve 200, a more detailed description of the valve 200 and how it interfaces with the aircraft and various external instrumentation and control equipment will now be described. In doing so, reference should now be made to the functional block diagram illustrated in FIG. 3. As shown, the integrated cabin pressure control system valve 200 is mounted on the aircraft bulkhead 302, such that the inlet flow port 210 is exposed to the aircraft cabin 304 and the outlet flow port 212 is exposed to the atmosphere external of the aircraft 306. Thus, during flight the pressure in the aircraft cabin 304 can be controlled by controlling the position of the valve disk 204. The valve disk 204, as was noted above, is positioned by the actuator assembly 206. In the depicted embodiment, the actuator assembly 206 includes a plurality of motors 306 (one for each channel in the electronic control unit 208) each mechanically coupled to a gear train 308 that is, in turn, mechanically coupled to the valve disk 204. The gear train 308 includes a summing junction so that, if necessary, both motors 306 can simultaneously drive the gear train 308. It will be appreciated that the actuator assembly 206 could also be implemented using either a single motor 306, or more than two motors 306.

Figure 3:
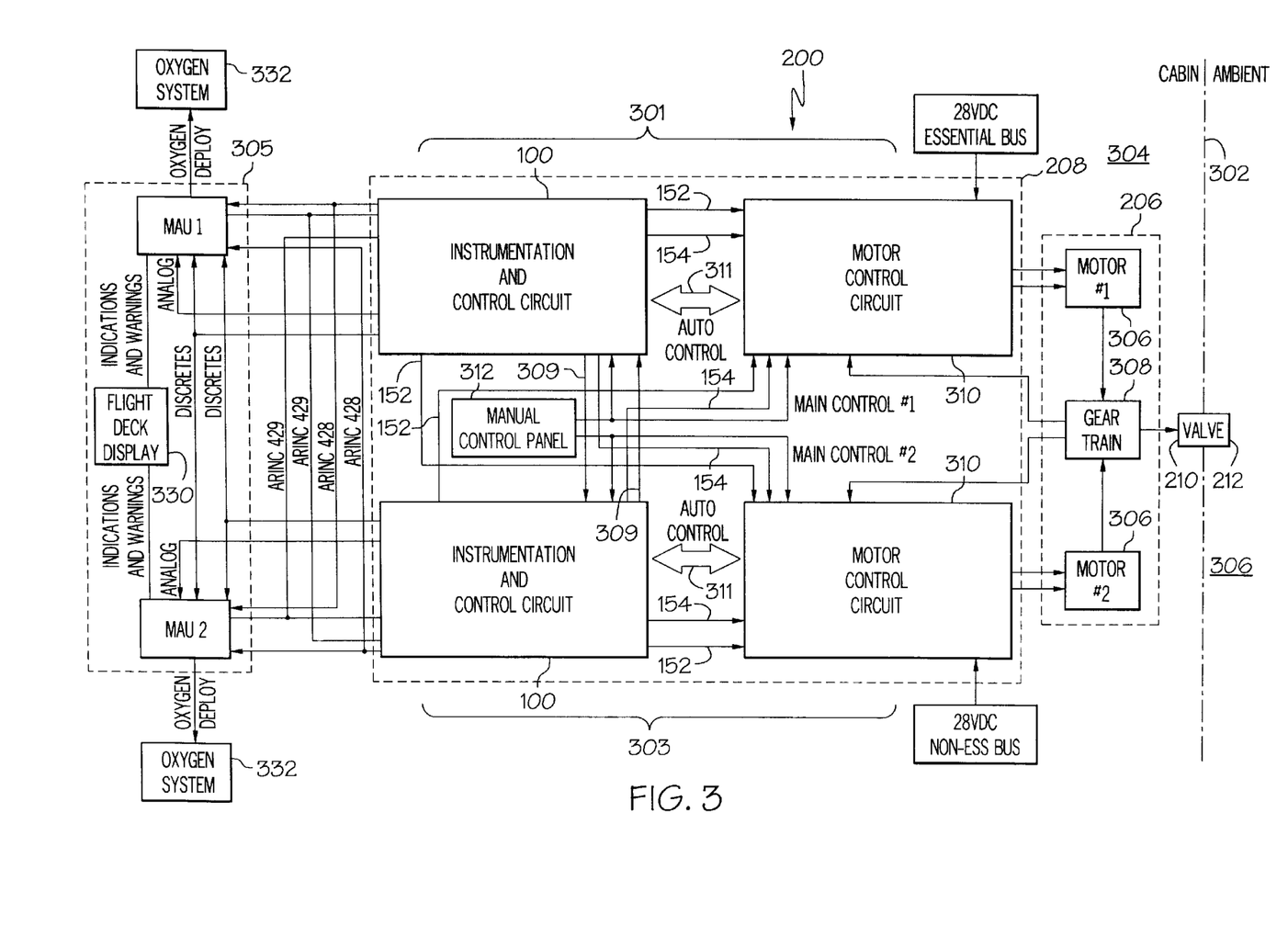
FIG. 3 is a functional block diagram of the cabin pressure control system of FIG. 2 and its interface to other equipment.

As was previously noted, the electronic control unit 208 is preferably a redundant, dual-channel controller, including a first channel 301 and a second channel 303. The skilled artisan will appreciate that the electronic control unit also could be configured with more than two redundant channels. During operation, one of the channels 301 (303) is active while the other channel 303 (301) is inactive. Channel health is communicated between, and monitored by, each channel 301, 303 via interchannel communication links 309. Thus, if the active channel 301 (303) detects a fault within itself or otherwise becomes inoperative, the previously inactive channel 303 (301) will sense this and become the active channel and the previously active channel 301 (303) will become inactive.

Each controller channel 301, 303 includes the previously described instrumentation and control circuit 100, and a motor control circuit 310. As was also mentioned above, in this configuration, the instrumentation and control circuit 100 in each channel supplies actuation control signals 311, as well as the previously described altitude limit discrete logic signals 152, 154, to the other channel's motor control circuit 310, as well as to its own motor control circuit 310. The instrumentation and control circuit 100 in each channel additionally supplies the previously described alarm, indication, and oxygen deployment signals to the aircraft's avionics system 305, in the various data transmission formats. The motor control circuit 310 receives actuation control signals from either the instrumentation and control circuit 100 or a manual control panel 312 and, in response to these signals, controls the actuator assembly 206, to thereby control the position of the valve disk 204 and thus cabin pressure. It is noted that the motor control circuit 310 may be implemented using any one of numerous known motor control schemes. Moreover, the skilled artisan will appreciate that the system could be implemented using separate manual control panels 312, or may include one or more additional manual control panels that completely bypass each of the control channels 301, 303 and supply actuation signals directly to the motors 306. It is additionally noted that the valve 200 could be implemented as a pneumatically controlled valve or a hydraulically controlled valve.

The avionics system 305 receives the various indication, alarm, and oxygen deployment logic signals supplied from the instrumentation and control circuits 100 in the electronic control unit 208. The avionics equipment 305 appropriately processes these signals and displays cabin pressure altitude, cabin pressure altitude rate of change, cabin-to-ambient differential pressure, and high altitude warnings on a flight deck display panel 330, and supplies appropriate oxygen deployment signals to the aircraft's oxygen supply system 332. The particular method by which each channel of the avionics system 305 processes the signals supplied from the instrumentation and control circuit 100 may vary, and the particular circuit configurations and software processing may also vary. The particular method used is not necessary to an understanding of the present invention and will therefore not be further described.

The instrumentation and control circuit 100 uses multiple, dissimilar sensors and signals for warnings, indications, and controls, and reduces the likelihood of a gradual decompression without indication event. The circuit 100 may be implemented in a cabin pressure control system that is integrated with a control valve 200. In doing so, the integrated cabin pressure control system reduces the likelihood of the gradual decompression without indication event, and does not result in substantially increased installation, integration, and maintenance costs, nor does it significantly increase aircraft weight, or take up additional space within the aircraft.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft cabin pressure control valve, comprising:
    a valve body;
    a valve mounted in the valve body and moveable between a closed position and an open position;
    at least two controller circuits mounted on the valve body, each controller circuit operable to sense the cabin pressure and supply a valve actuation signal; and
    a valve actuator mounted on the valve body and operable, in response to one or more of the valve actuation signals, to position the valve to a predetermined position,
    wherein each of the controller circuits includes:
        a first pressure sensor operable to sense aircraft cabin pressure and supply a first pressure signal representative thereof,
        a second pressure sensor dissimilar from the first pressure sensor and operable to sense aircraft cabin pressure and supply a second pressure signal representative thereof,
        a digital signal conditioning circuit coupled to receive the first pressure signal and operable, in response thereto, to supply a digital pressure signal,
        an analog signal conditioning circuit coupled to receive the second pressure signal and operable, in response thereto, to supply an analog pressure signal, and
        a processor coupled to receive the analog pressure signal and the digital pressure signal and operable, in response thereto, to supply (i) a signal in a first data transmission format that is representative of cabin pressure altitude and (ii) the valve actuation signal.

2. The valve of claim 1, wherein in the processor is further operable to supply a signal in the first data transmission format that is representative of a rate of change of cabin pressure altitude.

3. The valve of claim 1, wherein:
    the processor is further coupled to receive a signal representative of ambient pressure outside of the aircraft; and
    the processor is further operable to supply a signal in the first data transmission format that is representative of a differential pressure between the aircraft cabin pressure and the ambient pressure.

4. The valve of claim 1, wherein the processor is further operable to supply at least one warning/control signal in the first data transmission format when the signal representative of cabin pressure altitude is at or above at least one predetermined set point.

5. The valve of claim 4, wherein the processor is further operable to supply at least one warning/control signal in a second data transmission format when the signal representative of cabin pressure altitude is at or above at least one predetermined set point.

6. The valve of claim 5, wherein the warning/control signals supplied by the processor include at least a high altitude warning signal and an oxygen deployment control signal.

7. The valve of claim 6, wherein the warning/control signals supplied by the processor further include an altitude limit control signal.

8. The valve of claim 5, further comprising:
a discrete signal processing circuit coupled to receive (i) the warning/control signals in the second data transmission format and (ii) the analog pressure signal, and operable to supply at least one discrete logic signal when one of the analog pressure signal and the processed warning/control signals is at or below at least one predetermined set point.

9. The valve of claim 8, wherein the discrete signal processing circuit comprises:
at least one comparator circuit having a first input terminal coupled to a reference voltage magnitude representative of a warning/control set point and a second input terminal coupled to receive the analog pressure signal, each comparator circuit operable to supply an analog warning/control signal when the analog pressure signal is at or below the reference voltage magnitude; and
at least one logic OR circuit having a first input terminal coupled to receive one of the analog warning/control signals and a second input terminal coupled to receive one of the warning/control signals in the second data transmission format, and operable to supply a discrete logic signal upon receipt of one of the analog warning/control signals and processed warning/control signals.

10. The valve of claim 1, further comprising:
an analog-to-digital converter circuit coupled between the second signal conditioning circuit and the processor and operable to convert the analog pressure signal into a second digital pressure signal.

11. A circuit for supplying one or more signals representative of an aircraft cabin environment, comprising:
a first pressure sensor operable to sense aircraft cabin pressure and supply a first pressure signal representative thereof;
a second pressure sensor dissimilar from the first pressure sensor and operable to sense aircraft cabin pressure and supply a second pressure signal representative thereof;
a digital signal conditioning circuit coupled to receive the first pressure signal and operable, in response thereto, to supply a first digital pressure signal;
an analog signal conditioning circuit coupled to receive the second pressure signal and operable, in response thereto, to supply an analog pressure signal; and
a processor coupled to receive the analog pressure signal and the digital pressure signal and operable, in response thereto, to supply a signal in a first data transmission format that is representative of cabin pressure altitude.

12. The circuit of claim 11, wherein the processor is further operable to supply a signal in the first data transmission format that is representative of a rate of change of cabin pressure altitude.

13. The circuit of claim 11, wherein:
the processor is further coupled to receive a signal representative of ambient pressure outside of the aircraft; and
the processor is further operable to supply a signal in the first data transmission format that is representative of a differential pressure between the aircraft cabin pressure and the ambient pressure.

14. The circuit of claim 11, wherein the processor is further operable to supply at least one warning/control signal in the first data transmission format when the signal representative of cabin pressure altitude is at or above at least one predetermined set point.

15. The circuit of claim 14, wherein the processor is further operable to supply at least one warning/control signal in a second data transmission format when the signal representative of cabin pressure altitude is at or above at least one predetermined set point.

16. The circuit of claim 15, wherein the warning/control signals supplied by the processor include at least a high altitude warning signal and an oxygen deployment control signal.

17. The circuit of claim 16, wherein the warning/control signals further include an altitude limit control signal.

18. The circuit of claim 15, further comprising:
a discrete signal processing circuit coupled to receive (i) the processed warning/control signals in the second data transmission format and (ii) the analog pressure signal and operable to supply at least one discrete logic signal when one of the analog pressure signal and the processed warning/control signals is at or below at least one predetermined set point.

19. The circuit of claim 18, wherein the discrete signal processing circuit comprises:
at least one comparator circuit having a first input terminal coupled to a reference voltage magnitude representative of a warning/control set point and a second input terminal coupled to receive the analog pressure signal, each comparator circuit operable to supply an analog warning/control signal when the analog pressure signal is at or below the reference voltage magnitude; and
at least one logic OR circuit having a first input terminal coupled to receive one of the analog warning/control signals and a second input terminal coupled to receive one of the warning/control signals in the second data transmission format, and operable to supply a discrete logic signal upon receipt of one of the analog warning/control signals and processed warning/control signals.

20. The circuit of claim 11, further comprising:
an analog-to-digital converter circuit coupled between the second signal conditioning circuit and the processor and operable to convert the analog pressure signal into a second digital pressure signal.

21. The circuit of claim 11, wherein the processor is further operable to supply a valve actuation signal for positioning an outflow valve.

22. A controller circuit for controlling the position of a valve to thereby control cabin pressure in an aircraft, the controller circuit comprising:
a first pressure sensor operable to sense aircraft cabin pressure and supply a first pressure signal representative thereof,
a second pressure sensor dissimilar from the first pressure sensor and operable to sense aircraft cabin pressure and supply a second pressure signal representative thereof,
a digital signal conditioning circuit coupled to receive the first pressure signal and operable, in response thereto, to supply a first digital pressure signal;
an analog signal conditioning circuit coupled to receive the second pressure signal and operable, in response thereto, to supply an analog pressure signal; and
a processor coupled to receive the analog pressure signal and the digital pressure signal and operable, in response thereto, to supply (i) a signal in a first data transmission format that is representative of cabin pressure altitude and (ii) the valve actuation signal.

23. The circuit of claim 22, wherein the processor is further operable to supply a signal in the first data transmission format that is representative of a rate of change of cabin pressure altitude.

24. The circuit of claim 22, wherein:
the processor is further coupled to receive a signal representative of ambient pressure outside of the aircraft; and
the processor is further operable to supply a signal in the first data transmission format that is representative of a differential pressure between the aircraft cabin pressure and the ambient pressure.

25. The circuit of claim 22, wherein the processor is further operable to supply at least one warning/control signal in the first data transmission format when the signal representative of cabin pressure altitude is at or above at least one predetermined set point.

26. The circuit of claim 25, wherein the processor is further operable to supply at least one warning/control signal in a second data transmission format when the signal representative of cabin pressure altitude is at or above at least one predetermined set point.

27. The circuit of claim 26, wherein the warning/control signals supplied by the processor include at least a high altitude warning signal and an oxygen deployment control signal.

28. The circuit of claim 27, wherein the warning/control signals further include an altitude limit control signal.

29. The circuit of claim 26, further comprising:
a discrete signal processing circuit coupled to receive (i) the processed warning/control signals in the second data transmission format and (ii) the analog pressure signal and operable to supply at least one discrete logic signal when one of the analog pressure signal and the processed warning/control signals is at or below at least one predetermined set point.

30. The circuit of claim 29, wherein the discrete signal processing circuit comprises:
at least one comparator circuit having a first input terminal coupled to a reference voltage magnitude representative of a warning/control set point and a second input terminal coupled to receive the analog pressure signal, each comparator circuit operable to supply an analog warning/control signal when the analog pressure signal is at or below the reference voltage magnitude; and
at least one logic OR circuit having a first input terminal coupled to receive one of the analog warning/control signals and a second input terminal coupled to receive one of the warning/control signals in the second data transmission format, and operable to supply a discrete logic signal upon receipt of one of the analog warning/control signals and processed warning/control signals.

31. The circuit of claim 22, further comprising:
an analog-to-digital converter circuit coupled between the second signal conditioning circuit and the processor and operable to convert the analog pressure signal into a second digital pressure signal.

32. A method of determining cabin pressure altitude in an aircraft cabin, comprising:
determining cabin pressure using a first pressure determination method;
determining cabin pressure using a second pressure determination method that is different from the first pressure determination method; and
determining cabin pressure altitude based on the cabin pressure determined using at least one of the first and the second pressure determination methods.

33. The method of claim 32, further comprising:
supplying a signal in a first data transmission format that is representative of the determined cabin pressure altitude.

34. The method of claim 32, further comprising determining a rate of change of cabin pressure altitude based on the cabin pressure determined using at least one of the first and the second pressure determination methods.

35. The method of claim 34, further comprising:
supplying a signal in a first data transmission format that is representative of the determined rate of change of cabin pressure altitude.

36. The method of claim 32, further comprising:
determining ambient pressure outside of the aircraft; and
determining a differential pressure between the aircraft cabin pressure and the ambient pressure based on the determined ambient pressure and the cabin pressure determined using at least one of the first and the second pressure determination methods.

37. The method of claim 36, further comprising:
supplying a signal in a first data transmission format that is representative of the determined differential pressure.

38. The method of claim 32, further comprising:
supplying at least one warning/control signal in a first data transmission format when the determined cabin pressure altitude is at or above at least one predetermined set point.

39. The method of claim 38, further comprising:
supplying at least one warning/control signal in a second data transmission format when the determined cabin pressure altitude is at or above at least one predetermined set point.

40. The method of claim 39, wherein the supplied warning/control signals include at least a high altitude warning signal and an oxygen deployment control signal.

41. The method of claim 40, wherein the supplied warning/control signals further include an altitude limit control signal.

42. The method of claim 32, further comprising:
supplying a signal in a second data transmission format that is representative of the cabin pressure determined using the first pressure sensor according to a first data transmission format.

43. The method of claim 32, further comprising:
positioning a cabin pressure control system outflow valve based on the determined cabin pressure altitude.

44. In an aircraft cabin pressure control system having an outflow valve that is used to control cabin pressure in an aircraft, a method of controlling outflow valve position, comprising:
determining the cabin pressure using a first pressure determination method;
determining the cabin pressure using a second pressure determination method that is different from the first pressure determination method;
determining cabin pressure altitude based on the cabin pressure determined using at least one of the first and the second pressure determination methods; and
controlling the position of the outflow valve based on the determined cabin pressure altitude.

45. The method of claim 44, further comprising:
supplying a signal in a first data transmission format that is representative of the determined cabin pressure altitude.

46. The method of claim 44, further comprising determining a rate of change of cabin pressure altitude based on the cabin pressure determined using at least one of the first and the second pressure determination methods.

47. The method of claim 46, further comprising:

supplying a signal in a first data transmission format that is representative of the determined rate of change of cabin pressure altitude.

48. The method of claim 44, further comprising:

determining ambient pressure outside of the aircraft; and determining a differential pressure between the aircraft cabin pressure and the ambient pressure based on the determined ambient pressure and the cabin pressure determined using at least one of the first and the second pressure determination methods.

49. The method of claim 48, further comprising:

supplying a signal in a first data transmission format that is representative of the determined differential pressure.

50. The method of claim 44, further comprising:

supplying at least one warning/control signal in a first data transmission format when the determined cabin pressure altitude is at or above at least one predetermined set point.

51. The method of claim 50, further comprising:

supplying at least one warning/control signal in a second data transmission format when the determined cabin pressure altitude is at or above at least one predetermined set point.

52. The method of claim 51, wherein the supplied warning/control signals include at least a high altitude warning signal and an oxygen deployment control signal.

53. The method of claim 51, wherein the supplied warning/control signals further include an altitude limit control signal.

54. The method of claim 44, further comprising:

supplying a signal in a second data transmission format that is representative of the cabin pressure determined using the first pressure sensor according to a first data transmission format.

* * * * *